United States Patent [19]

Wright et al.

[11] Patent Number: 4,580,322

[45] Date of Patent: Apr. 8, 1986

[54] QUICK RELEASE FASTENER

[75] Inventors: Andrew C. Wright; Ronald F. Simpson, both of Farnham, England

[73] Assignee: Dzus Fastener Co., Inc., West Islip, N.Y.

[21] Appl. No.: 458,969

[22] Filed: Jan. 18, 1983

[30] Foreign Application Priority Data

Jun. 24, 1982 [GB] United Kingdom ................ 8218298
Oct. 7, 1982 [GB] United Kingdom ................ 8228734

[51] Int. Cl.⁴ .............................................. F16B 21/02
[52] U.S. Cl. ........................................ 24/662; 24/663; 24/590; 411/349; 411/528
[58] Field of Search ............... 411/349, 500, 508, 509, 411/510, 520, 528, 549, 550, 551, 552, 555; 24/590, 591, 662, 663

[56] References Cited

U.S. PATENT DOCUMENTS

| 2,200,702 | 5/1970 | Oddie | 411/349 |
| 2,416,873 | 4/1947 | Gorfin | 411/551 |
| 2,454,223 | 11/1948 | Shippee | 411/349 |
| 2,552,066 | 5/1951 | Sorensen | 411/549 X |
| 2,936,668 | 5/1960 | Meyer | 411/520 |
| 3,802,033 | 4/1974 | Gley | 411/549 |
| 3,893,211 | 7/1975 | Skinner | 411/349 |

FOREIGN PATENT DOCUMENTS

| 508223 | 12/1954 | Canada | 24/662 |
| 1519357 | 7/1978 | United Kingdom | 411/509 |
| 1588556 | 4/1981 | United Kingdom | 411/349 |

Primary Examiner—Thomas J. Holko
Attorney, Agent, or Firm—Kane, Dalsimer, Kane, Sullivan and Kurucz

[57] ABSTRACT

A fastener has a receptacle (1) and a stud (10), the receptacle (1) having a pair of clip-like legs (6) the ends of which engage in grooves (16) in the shank of the stud (10). Each of the legs (6) has a plurality of formations (8) on its inner surface, the formations being shaped so as to engage the wedge-shaped lead-in portion (14) of the stud as it is inserted into the receptacle so as to rotate the stud into a position in which the legs (6) of the receptacle must engage in opposed grooves (16) on the shank of the stud.

14 Claims, 12 Drawing Figures

QUICK RELEASE FASTENER

The present invention relates to quick-release fasteners which comprise a receptacle and a stud which is engageable in the receptacle to lock a first member, to which the stud is secured, to a second member to which the receptacle is secured. More particularly the invention relates to so-called "push-to-lock, turn-to-unlock" quick-release fasteners. A typical such fastener is that shown in GB-A-1519357.

A particular problem with fasteners of this type, i.e. those that comprise a one-piece receptacle which includes a pair of clip-like legs, the free ends of which extend towards one another for engagement with depressions or grooves formed in the shank of a complementary stud to retain the stud held in position on the receptacle, is that the stud can be inserted into the receptacle with the grooves on the shank of the stud perpendicular to the abutments formed by the ends of the clip-like legs, in which case the stud will not engage securely with the receptacle.

It has been proposed to overcome this problem by forming a lead-in portion on the nose of the stud with particular formations which orientate the stud into a position in which, during engagement of the stud with the receptacle, the stud is turned into a position in which the clip-like legs must engage properly with the grooves or recesses on the shank of the stud (see for example GB-A-1,465,262, and GB-A-1,588,556). Whilst these means of rotating the stud may work satisfactorily in practice it will be appreciated that complex machining or other forming processes are needed in order accurately to form the lead-in portion of the stud.

According to the present invention a receptacle for such a quick-release fastener, the receptacle including a pair of clip-like legs, the free ends of which extend towards one another for engagement with depressions or grooves formed in the shank of a complementary stud, has a plurality of formations on the inner surface of each clip-like leg, the formations on the opposed legs being formed so as to rotate the lead-in portion of the complementary stud by engagement therewith, on insertion of the stud into the receptacle.

The invention also includes a stud for such a quick-release fastener, the stud having a wedge-shaped lead-in portion, thus presenting an elongate cross-section, and at least one pair of oppositely directed grooves on opposite sides of the shank of the stud for engagement with the clip-like legs of a complementary receptacle. In use with a receptacle in accordance with the invention as described above, the corners of the wedge-shaped lead-in portion engage with the formations on the clip-like legs of the receptacle and are caused to rotate so that the grooves lie generally in alignment with the longitudinal dimension of the gap between the ends of the clip-like legs, rather than across that longitudinal dimension. Thus, as the lead-in portion of the stud is pushed between the clip-like legs the ends of those legs engage positively with respective grooves on opposite sides of the shank of the stud.

The formations on the clip-like legs may comprise a plurality of elongate protrusions inclined across the inner surface of each clip-like leg, the formations on the opposed legs being inclined in opposite directions when viewed axially. Alternatively, each of the formations may comprise a circular, triangular or rhombus-shaped protrusion, the protrusions on one leg being offset from those on the other along the longitudinal axis of the gap between the legs.

Preferably the receptacle includes a body part from which extend away from the plane of the body part the clip-like legs, and lateral ears extending from the body part generally in the plane of the body part, each of the clip-like legs having one or more barbs formed adjacent the junction between the legs and the body part, the barb or barbs extending outwardly away from the legs towards the plane of the body part whereby a support to which the receptacle is to be attached can be held between the lateral ears and the barbs alone on each side of an aperture in which the receptacle is located.

Preferably the stud according to the invention is formed with a plurality of pairs of oppositely directed grooves on each side of the shank, thus enabling the stud to be held in any one of a number of positions in the receptacle.

Advantageously, in order to spring the stud out of the receptacle on turning for release, the width of the stud across the larger dimension of the section of the wedge, i.e. the width across each of the grooved sides of the stud, preferably reduces towards the lead-in portion.

Preferably each of the clip-like legs of the receptacle has a wing extending from one side, or one leg has a wing extending from each side, across the space between the legs, thereby to at least partially close the sides of the receptacle. The wings can effectively prevent a stud which is misdirected on insertion from passing out of the side of the receptacle, thus ensuring proper engagement of the stud with the receptacle regardless of any misdirection of the stud on insertion.

According to a further aspect of the invention, the stud is formed from a blank of substantially circular cross-section having one or more frusto-conical tapers at one end, thereafter the tapered end of the stud being coined in a press with a pair of serrated tools to form the opposed grooves and the lead-in portion on opposite sides of the shank of the stud, the stud swelling during the coining process on two opposed edges not engaged by the press tools, and the taper or tapers on the blank being arranged such that the non-grooved edges of the stud after formation are tapered towards the end of the stud.

The opposed sides of the blank, on which the grooves and lead-in portion are formed by the coining process are widened by swelling during the coining process and the swelling is greatest adjacent to the end of the blank. The taper ensures that inspite of this the non-grooved edges of the stud shank still taper towards the end of the stud. It is this edge taper on the finished stud which cooperates with the receptacle legs to produce ejection of the stud. Depending upon the particular embodiment of the receptacle for use with a given stud, so the blank may have either a single frusto-conical taper, dual frusto-conical tapers, in which case the taper adjacent the end of the blank will have a greater taper angle than the other taper, and the end of the blank may be radiussed or not, again depending upon the specific raquirements for the shape of the non-grooved sides of the finished stud.

One example of a fastener according to the present invention will now be described with reference to the accompanying drawings in which.

Figure 1:
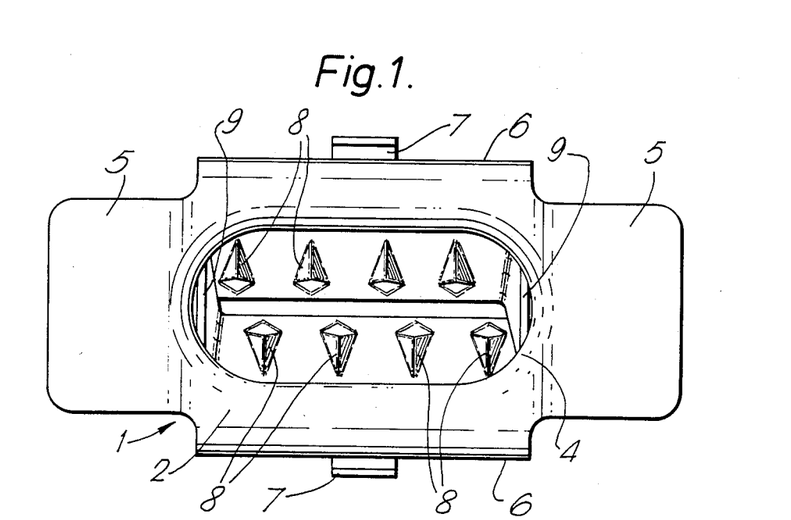
FIG. 1 comprises a plan view of the receptacle.
Figure 2:
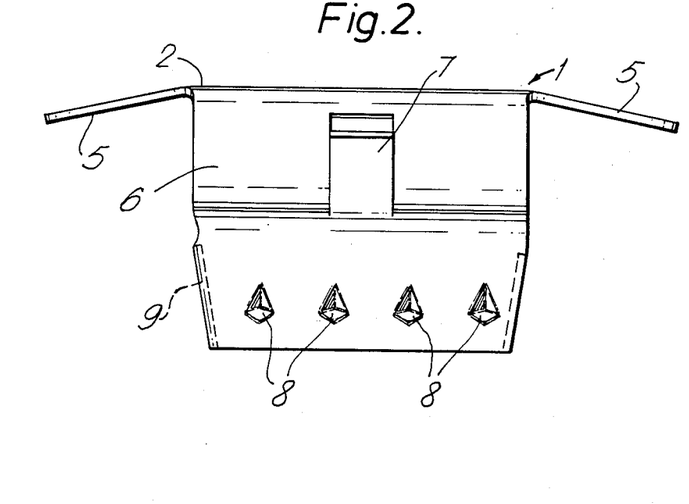
FIG. 2 is a first side elevational view of the receptacle.

The fastener receptacle 1 comprises a body part 2 with a central elongate aperture 3 the edge 4 of which is rolled over away from the plane of the body part as seen in FIG. 1. This facilitates insertion of the stud in operation. A pair of lateral ears 5 extend away from the body part on opposite narrower sides of the body part, the ears 5 being generally co-planar with the body part, but having a slight angle to the body part 4 as can be seen in FIG. 2. Extending away from the plane of the body part 2 and inclined towards one another are clip-legs 6. Each of the legs 6 carries a barb 7 which in use engages against the rear face of a support so that the receptacle is held between the barbs 7 and ears 5.

Each of the legs 6 has a plurality of rhombus-shaped formations 8 formed on its inner surface as protrusions extending inwardly of the leg, the formations 8 on opposite legs being staggered with respect to one another (as seen in FIG. 1). Alternatively, the protrusions may be substantially triangular, although the sides of the protrusions in that case be slightly curved in practice, or may be circular. It will be appreciated that as a tapered stud is inserted between the legs the corners of the end of the stud will engage with one of the included surfaces of the protrusions 8 on each of the legs, the staggering of the protrusions ensuring that the engagement is such that the stud must be turned into a position in which it is inclined to a line extending perpendicularly to the edges of the legs, i.e. across the gap between the legs, thereby ensuring that the stud turns further as it continued to be pushed through the edges of the clip-like legs, the edges of the clip-like legs thus engaging with the grooves on opposite sides of the stud as will be described later.

Figure 3:
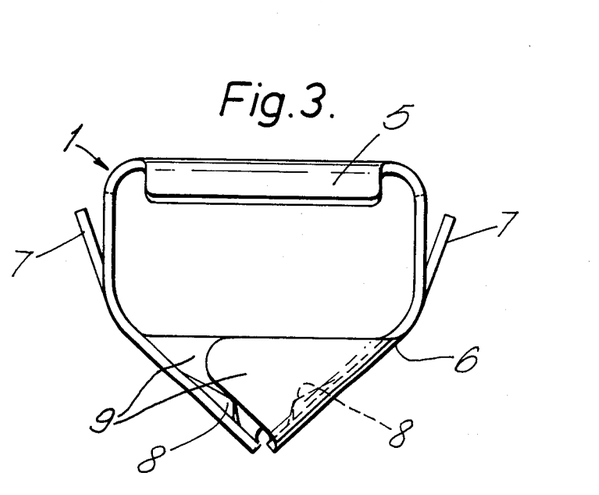
FIG. 3 is similar elevation at 90° to that of FIG. 2.

As shown in FIG. 3 each of the legs 6 has a wing 9 formed at one side edge and extending partially across the open side of the receptacle between the opposed legs. FIG. 2 shows the alternative of both wings extending from the same leg. In use, if a stud is inserted at an angle into the receptacle, as it slides along the leg or legs towards the side of the receptacle it engages against the inner surface of one of the wings 9 and is thus prevented from passing out of the side of the receptacle into a position in which it would not be properly engaged or secured with the receptacle.

Figure 4:
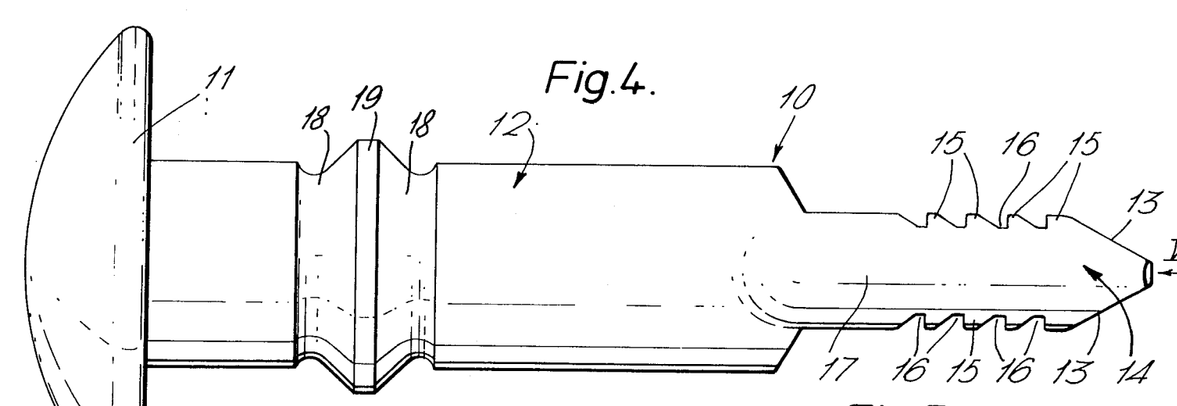
FIG. 4 is a first side elevational view of the stud.

The stud 10 has a head 11 which is formed with a suitable formation (not shown) such as a slot for a screwdriver bit or a hexagonal slot for an Allen key in order to enable rotation of the stud and shank 12. At its end remote from the head 11, that is to say at its lead-in end the shank 12 has opposed flat surfaces 13 which form a wedge 14 to enable the stud to push between the legs 6 of the receptacle when it is inserted into it.

Figure 5:
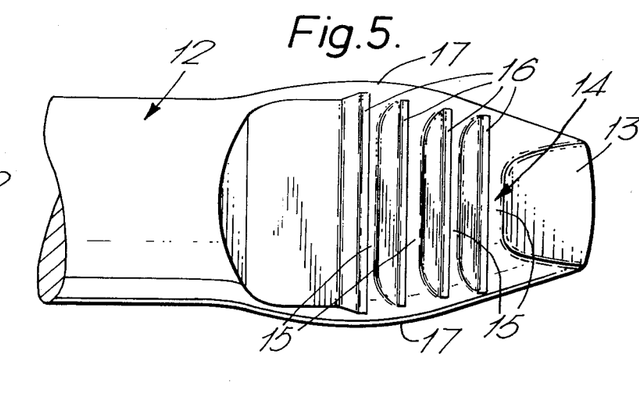
FIG. 5 is a partial elevation of the stud at right angles to that of FIG. 4.
Figure 6:
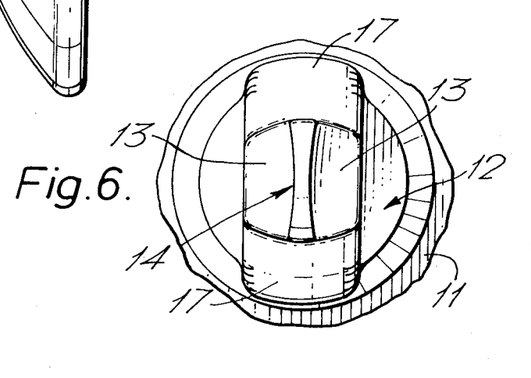
FIG. 6 is an end elevation on arrow VI—VI in FIG. 4.

At the end of the stud adjacent the wedge 14 the shank is reduced in width in one longitudinal plane and plurality of alternating shoulders 15 and grooves 16 are formed on opposed sides of the shank substantially parallel with one another. The narrower, non-grooved sides of the shank are, at the lead-in end of the shank, correspondingly widened to produce a curved taper 17 to ensure smooth and complete release of the stud from the receptacle in use.

Adjacent the head of the stud the shank 12 is narrowed at two waist portions 18, a ridge 19 of diameter slightly greater than the general diameter of the shank 12 being formed between the waisted portions 18.

Figure 7:
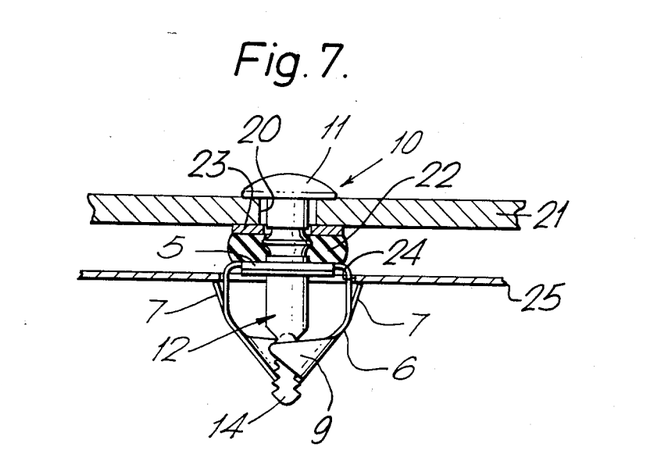
FIG. 7 is a side elevational view of the fastener showing the stud and receptacle engaged and holding a panel to a support.

In use, see FIG. 7, the stud 10 is mounted in a preferably circular aperture 20 in a panel 21, the stud being retained on the panel by means of a resilient washer 22 and a plastics retaining washer 23. It can be seen from FIG. 7 that the retaining washer 23 has a diameter slightly less than that of the ridge 19 of the stud so that it is a snap fit over the ridge when the stud is inserted into the aperture 20 in the panel 21 and retains the stud loosely in the aperture. In addition, the retaining washer 23 enables the stud to be pushed into the receptacle 1 by a push on the panel 21, thus avoiding the need for the engagement of the stud with the receptacle to be achieved only by pushing on the head of the stud. The rubber washer 22 serves, in the present example, as a spacer member between the panel and the support, and also as a resilient spring member to aid release of the stud from the receptacle in use.

The receptacle 1 is mounted in a generally rectangular aperture 24 in a support 25, the aperture being of a size closely to surround the receptacle, and thus enabling the receptacle to be snap-fitted into the aperture by means of inward movement of the legs 6 and barbs 7 as the receptacle is inserted, the barbs 7 and legs 6 springing outwardly after passing through the aperture and the receptacle thus being held between the ears 5 and the barbs 7.

In FIG. 7 the stud is shown inserted with the edges of the legs 6 engaging a second one of the grooves 16, but it will be appreciated that engagement with others of the pairs of grooves is possible depending upon the desired gap required between the panel 21 and support 25, and different resilient washers 22 may be positioned on the stud in consequence partly to determine this.

To insert the stud into the receptacle all that is necessary is either for the head of the stud or for the panel to be pushed following alignment of the stud with the receptacle, the rotational position of the stud within the receptacle being irrelevant due to the orientating function of the formations on the legs 6 of the receptacle, operating by engagement with the end of the stud.

To release the stud from the receptacle all that is necessary is for the stud to be rotated by means of a tool applied to the head 11 through 90°, the side surfaces 17 forcing the clip-like legs apart and the resilience of the clip-legs thus providing an outwardly biassing force on the stud 10 to push it out of the receptacle, the outward movement of the stud from the receptacle being aided by the resilience of the washer 22.

Preferably the receptacle is made from springsteel in a cruciform-shaped blank which is then cut and bent to shape and the stud will preferably be metal also, but it is envisaged that a similar fastener could be manufactured in which the stud and receptacle were of plastics material.

Figure 8:
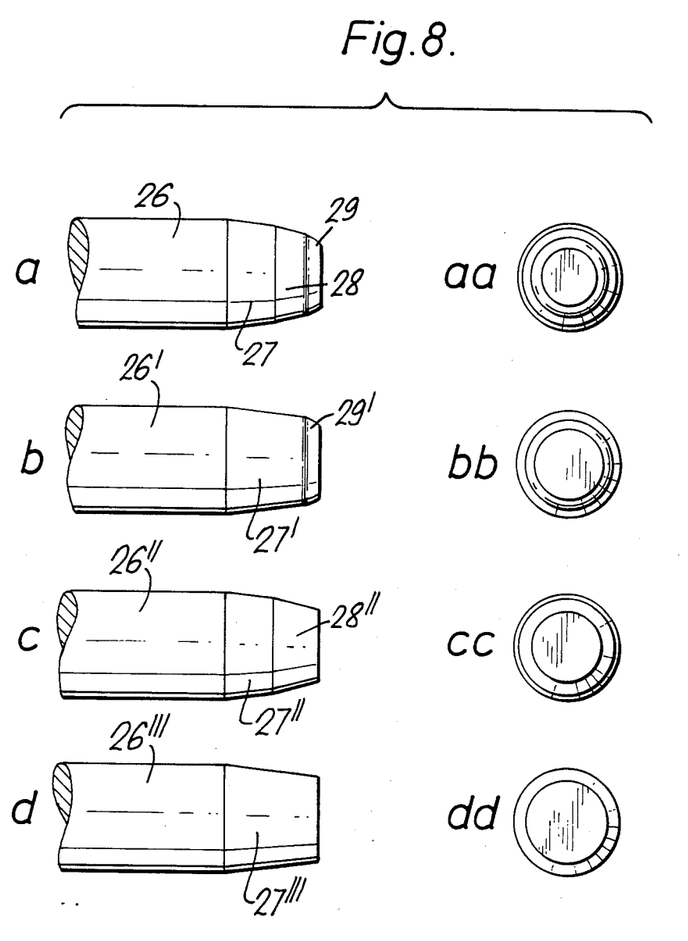
FIG. 8 shows various side elevational views and axial views of tapered blanks suitable for forming the stud.

The stud shown in the drawings was manufactured from a tapered blank 26 shown in FIGS. 8a and aa, the blank having a pair of end tapers 27, 28, and a radiused end 29. During formation of the stud a pair of opposed press tools 30 (see FIG. 9) engage the end of the blank to coin the grooves 16 into opposed sides of the blank, thus expanding the non-grooved sides between the press tools. In order to ensure the desired tapered shape at the end of the stud it is important that the non-grooved edges of the end of the stud are expanded less towards the end of the stud than towards the middle of the stud and the tapers 27,28 and radiused end 29 are configured to achieved this by providing less material for the expansion during the coining process.

Figure 9:
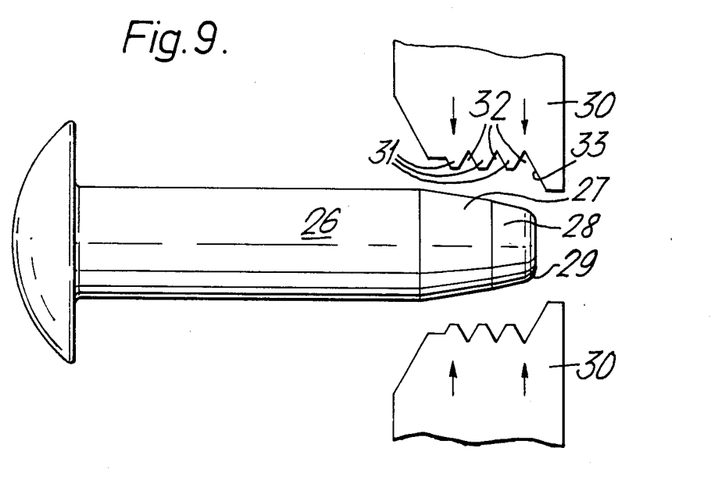
FIG. 9 is a diagrammatic side elevation of a blank and pair of press tools; and, FIGS. 10, 11 and 12 are plan views corresponding to FIG. 1 showing alternative formations on the receptacle legs.

Each of the press tools 30 has a series of grooves 31 separated by shoulders 32 which, during the coining process bite into the tapered end of the blank 26, squeezing the stud and forming the grooves and wedge-shaped lead-in portion 14. Each of the press tools has a surface 33 for forming a respective flat face 13 of the wedge on the stud.

It will be appreciated that a range of fasteners of the type according to the invention will be desired to be produced and, depending upon the size and use of the particular fasteners so the lead-in position at the end of the stud will require to have slightly different shapes and thus alternative forms at the end of the blank, 26', 26'', 26''', are shown in the remaining parts of FIG. 8, in FIG. 8b, there being but a single frusto-conical taper 27' and the blank having a radiussed end 29'. The blanks shown in FIGS. 8c and 8d, do not have the radiussed end, and FIG. 8c shows a blank with two tapers 27'', 28'' and FIG. 8d a single frusto-conical taper 27'''.

Figure 10:
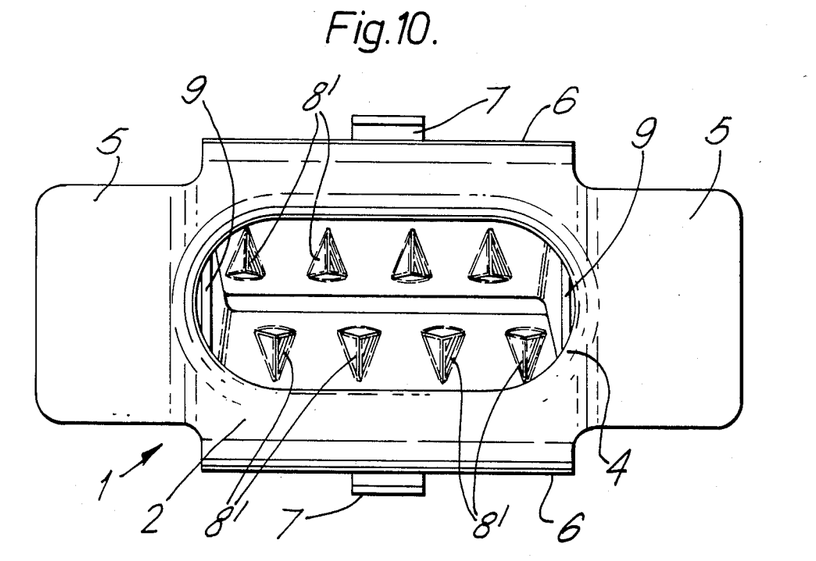
Figure 11:
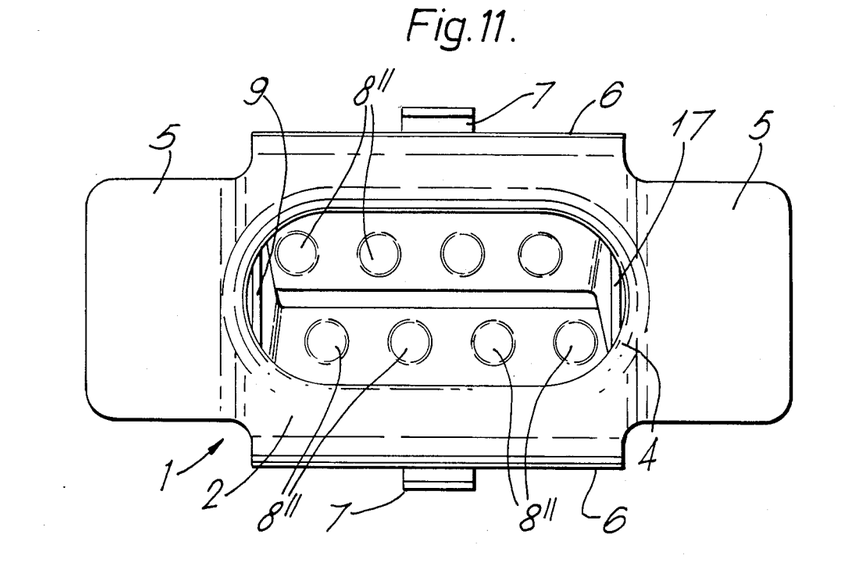
Figure 12:
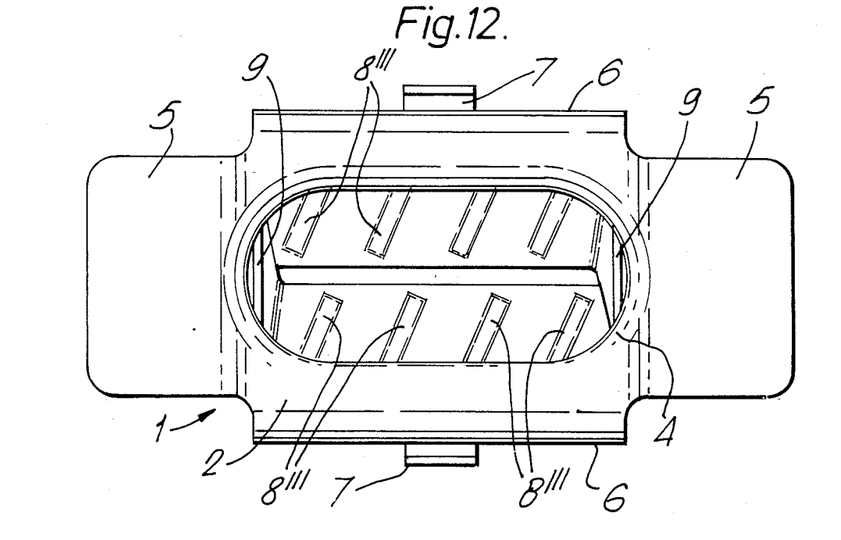

FIGS. 10. 11 and 12 show, respectively, substantially triangular, circular and rib-like elongate protusions 8', 8'', 8''' respectively, on alternative forms of receptacle.

We claim:

1. A receptacle for a quick-release fastener, the receptacle including a pair of clip-like legs, said legs having free ends and said free ends extending towards one another for engagement with depressions or grooves formed in the shank of a complementary stud, said receptacle further including a plurality of formations on an inner surface of each of said legs, said formations being configured to rotate said stud by engagement therewith on insertion of said stud into said receptacle; wherein said formations comprise a plurality of elongate protrusions inclined across the inner surface of each of said legs, said formations on said opposite legs being inclined in opposite directions.

2. A receptacle according to claim 1, wherein each of said clip-like legs has a wing extending from one side across the space between said legs thereby to at least partially close the sides of said receptacle.

3. A receptacle according to claim 1, wherein one of said legs has a wing extending from each side across the space between said legs thereby to at least partially close the sides of said receptacle.

4. A receptacle according to claim 1, comprising a body part from which extend said clip-like legs; lateral ears substantially in the plane of said body part; and at least one barb formed on each of said legs adjacent the junction between said legs and said body part, said barb extending outwardly away from the respective one of said legs towards the plane of said body part, whereby a support to which said receptacle is to be attached can be held between said lateral ears and said barbs alone on each side of an aperture in which said receptacle is located in use.

5. A receptacle for a quick-release fastener, the receptacle including a pair of clip-like legs, said legs having free ends and said free ends extending towards one another for engagement with depressions or grooves formed in the shank of a complementary stud, said receptacle further including a plurality of formations on an inner surface of each of said legs, said formations being configured to rotate said stud by engagement therewith on insertion of said stud into said receptacle; wherein each of said formations comprises a rhombus-shaped protrusion, said protrusions on said opposite legs being off-set from one another.

6. A receptacle according to claim 5, wherein each of said clip-like legs has a wing extending from one side across the space between said legs thereby to at least partially close the sides of said receptacle.

7. A receptacle according to claim 5, wherein one of said legs has a wing extending from each side across the space between said legs thereby to at least partially close the sides of said receptacle.

8. A receptacle according to claim 5, comprising a body part from which extend said clip-like legs; lateral ears substantially in the plane of said body part; and at least one barb formed on each of said legs adjacent the junction between said legs and said body part, said barb extending outwardly away from the respective one of said legs towards the plane of said body part, whereby a support to which said receptacle is to be attached can be held between said lateral ears and said barbs alone on each side of an aperture in which said receptacle is located in use.

9. A receptacle for a quick-release fastener, the receptacle including a pair of clip-like legs, said legs having free ends and said free ends extending towards one another for engagement with depressions or grooves formed in the shank of a complementary stud, said receptacle further including a plurality of formations on an inner surface of each of said legs, said formations being configured to rotate said stud by engagement therewith on insertion of said stud into said receptacle; wherein each of said formations comprises a circular protrusion, said protrusions on said opposite legs being off-set from one another.

10. A receptacle according to claim 9, wherein each of said clip-like legs has a wing extending from one side across the space between said legs thereby to at least partially close the side of said receptacle.

11. A receptacle according to claim 9, wherein one of said legs has a wing extending from each side across the space between said legs thereby to at least partially close the sides of said receptacle.

12. A receptacle according to claim 9, comprising a body part from which extend said clip-like legs; lateral ears substantially in the plane of said body part; and at least one barb formed on each of said legs adjacent the junction between said legs and said body part, said barb extending outwardly away from the respective one of said legs towards the plane of said body part, whereby a support to which said receptacle is to be attached can be held between said lateral ears and said barbs alone on each side of an aperture in which said receptacle is located in use.

13. A receptacle for a quick-release fastener, the receptacle including a pair of clip-like legs, said legs having free ends and said free ends extending towards one another for engagement with depressions or grooves formed in the shank of a complementary stud, said receptacle further including a plurality of formations on an inner surface of each of said legs, said formations being configured to rotate said stud by engagement therewith on insertion of said stud into said receptacle; one of said legs having a wing extending from one side across the space between said legs thereby at least partially closing the sides of said receptacle.

14. A receptacle for forming a quick-release fastener with a complementary stud, said receptable including a pair of clip-like legs, each of said legs having an inner face and a free end, said free ends of said legs extending towards one another for engagement with depressions or grooves formed in the shank of said complementary stud, wherein said receptacle further includes a plurality of protrusions protruding from each of said inner faces of the legs, said protrusions being configured to engage and rotate said stud by engagement with a lead-in portion of said stud on insertion of said stud into said receptacle.

* * * * *